United States Patent [19]

Okada et al.

[11] Patent Number: 5,598,748

[45] Date of Patent: *Feb. 4, 1997

[54] AXLE DRIVING APPARATUS

[75] Inventors: Hideaki Okada, Takarazuka; Shusuke Nemoto, Yao, both of Japan

[73] Assignee: Kanzaki Kokyukoki Mfg. Co., Ltd., Japan

[*] Notice: The term of this patent shall not extend beyond the expiration date of Pat. No. 4,932,209.

[21] Appl. No.: 453,778

[22] Filed: May 30, 1995

Related U.S. Application Data

[63] Continuation of Ser. No. 193,577, Feb. 7, 1994, Pat. No. 5,473,964, which is a continuation of Ser. No. 100,352, Jun. 21, 1993, abandoned, which is a continuation of Ser. No. 518,720, May 4, 1990, abandoned, which is a continuation of Ser. No. 304,581, Feb. 1, 1989, Pat. No. 4,932,209.

[30] Foreign Application Priority Data

| Feb. 3, 1988 | [JP] | Japan | 63-24193 |
| Mar. 9, 1988 | [JP] | Japan | 63-55828 |
| Mar. 18, 1988 | [JP] | Japan | 63-67005 |
| Jun. 16, 1988 | [JP] | Japan | 63-79665 |

[51] Int. Cl.$^6$ ............................ F16H 57/02; F16D 39/00
[52] U.S. Cl. .......................... 74/606 R; 60/487; 31/505; 180/53.1; 180/307
[58] Field of Search ............................. 60/487, 464, 490, 60/494, 453, 454, 484, 485; 91/505; 180/305, 307, 53.1, 53.4; 74/606 R

[56] References Cited

U.S. PATENT DOCUMENTS

| 1,136,363 | 4/1915 | Pepper . |
| 1,227,055 | 5/1917 | Kellog . |
| 2,480,069 | 8/1949 | Wright . |
| 3,209,538 | 10/1962 | Kuze . |
| 3,279,172 | 10/1966 | Kudo et al. . |
| 3,430,438 | 3/1969 | Weiss . |
| 3,486,335 | 12/1969 | Kern et al. . |
| 3,680,312 | 8/1972 | Forster . |
| 3,687,212 | 8/1972 | Forster . |
| 3,751,924 | 8/1973 | Brown et al. . |
| 3,808,814 | 5/1974 | Macy, II . |
| 3,898,807 | 8/1975 | Habiger . |
| 3,908,376 | 9/1975 | Steiger . |
| 3,944,010 | 3/1976 | Winter et al. . |
| 4,145,883 | 3/1979 | Forster . |
| 4,495,768 | 1/1985 | Valavaara . |
| 4,616,478 | 10/1986 | Jensen . |
| 4,627,237 | 12/1986 | Hutson . |
| 4,686,829 | 8/1987 | Thoma et al. . |
| 4,726,256 | 2/1988 | von Kaler et al. . |
| 4,756,208 | 7/1988 | Hayashi et al. . |
| 4,843,818 | 7/1989 | Thoma et al. . |
| 4,891,943 | 1/1990 | Okada . |

(List continued on next page.)

FOREIGN PATENT DOCUMENTS

| 439445 | 4/1912 | France . |
| 955691 | 1/1950 | France . |
| 1075915 | 2/1960 | Germany . |
| 3239223 | 6/1984 | Germany . |
| 61-266868 | 7/1986 | Japan . |
| 62-44198 | 3/1987 | Japan . |
| 62-101945 | 6/1987 | Japan . |
| 64-4520 | 1/1989 | Japan . |

*Primary Examiner*—Vinh T. Luong
*Attorney, Agent, or Firm*—Sterne, Kessler, Goldstein & Fox P.L.L.C.

[57] ABSTRACT

An axle driving apparatus wherein a hydraulic motor and a hydraulic pump for a hydro-static-transmission are housed in a transmission casing of the axle driving apparatus and a center section for connecting the hydraulic motor and hydraulic pump is disposed in the transmission casing, the center section being fixed at the butt joint portion at the transmission casing, and an oil passage from the hydraulic pump to the hydraulic motor at the center section is bent at a right angle so as to extend the motor shaft in parallel to the axles, so that the rotation direction of the motor shaft conventionally changed by bevel gears is changed by the oil passages in the center section.

4 Claims, 14 Drawing Sheets

U.S. PATENT DOCUMENTS

| | | |
|---|---|---|
| 4,899,541 | 2/1990 | Okada et al. . |
| 4,903,545 | 2/1990 | Louis et al. . |
| 4,905,472 | 3/1990 | Okada . |
| 4,914,907 | 4/1990 | Okada . |
| 4,918,918 | 9/1990 | Miki et al. . |
| 4,932,209 | 6/1990 | Okada et al. . |
| 4,953,426 | 9/1990 | Johnson . |
| 4,962,675 | 10/1990 | Aui et al. . |
| 4,979,583 | 12/1990 | Thoma et al. . |
| 5,031,403 | 7/1991 | Okada . |
| 5,156,576 | 10/1992 | Johnson . |
| 5,335,496 | 8/1994 | Azuma et al. . |
| 5,339,631 | 8/1994 | Ohashi . |
| 5,377,487 | 1/1995 | Azuma et al. . |

FIG·16
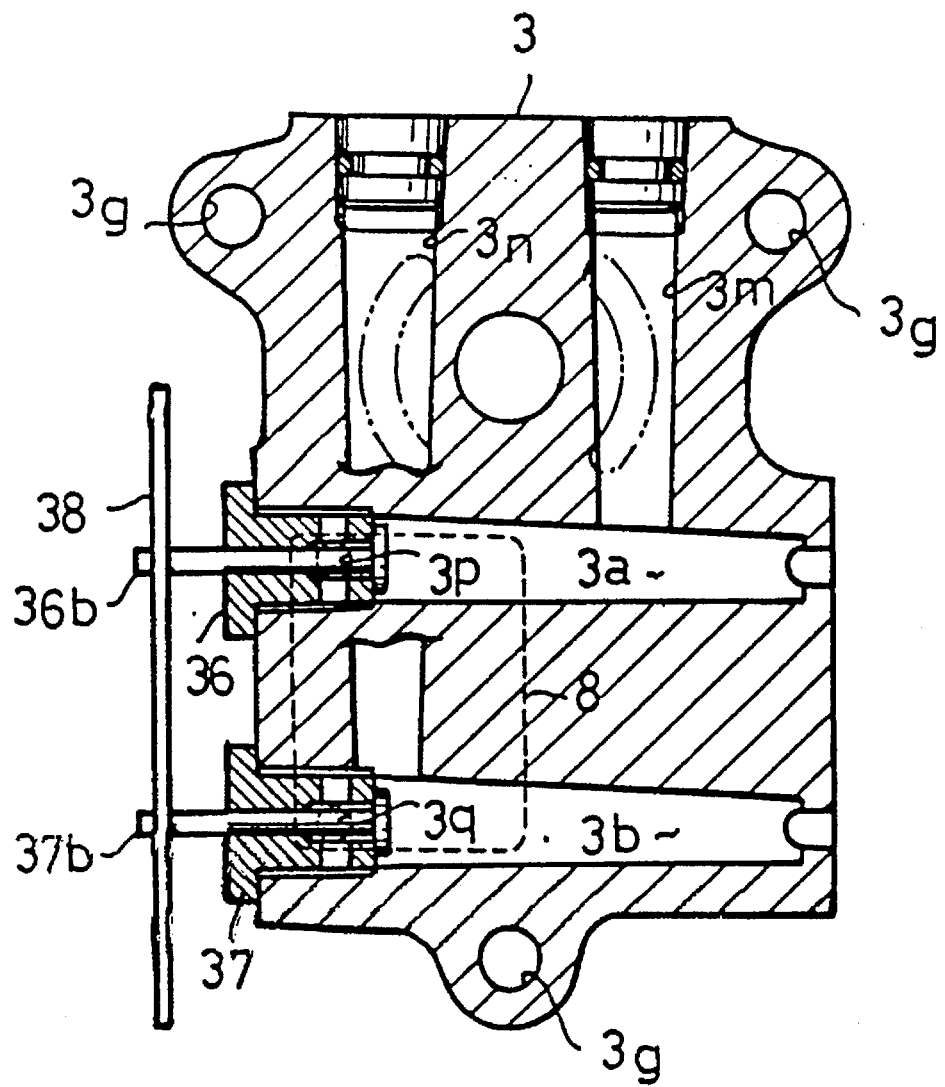

5,598,748

AXLE DRIVING APPARATUS

This application is a continuation of application Ser. No. 08/193,577, filed Feb. 7, 1994 (U.S. Pat. No. 5,473,964); which is a continuation of application Ser. No. 08/100,352, filed Jun. 21, 1993; now abandoned, which is a continuation of application Ser. No. 07/518,720, filed May 4, 1990, now abandoned; which is a continuation of application Ser. No. 07/304,581, filed Feb. 1, 1989 (U.S. Pat. No. 4,932,209).

BACKGROUND OF THE INVENTION

1. Field of the Invention

The present invention relates to an axle driving apparatus with a hydro-static-transmission used as a driving apparatus for a vehicle such as a light tractor.

2. Related Art

Conventionally, an axle driving apparatus, which vertically divides a casing thereof and journals axles at the divided surfaces and drives the axles by a hydro-static-transmission attached to the casing, is well known as disclosed in, for example, the Japanese Utility Model Publication Gazette No. Sho 62-44198 and the Japanese Patent Laid-Open Gazette Sho 62-101945, filed by the same applicant.

In the conventional apparatus, however, the hydro-static-transmission, separate from the axle driving apparatus, is fixed to the outside thereof in a manner of being exposed, whereby the apparatus is large-sized as a whole and larger in the gross weight. Also, it is required for driving the horizontally disposed axles by a motor shaft of a hydraulic motor vertically disposed at the exterior, to interpose bevel gears in a drive system for both the motor shaft and axles.

SUMMARY OF THE INVENTION

An object of the invention is to provide an axle driving apparatus which contains the hydraulic motor and a hydraulic pump of the hydro-static-transmission in a transmission casing of the axle driving apparatus, and a center section for connecting the hydraulic motor and hydraulic pump is disposed in the transmission casing, the center section being fixed to the butt joint surface of upper and lower sections of the casing.

The center section is formed in a L-like shape when viewed in section and an oil passage from the hydraulic pump to the hydraulic motor is bent at a right angle to thereby extend the motor shaft in parallel to the driven axle. Hence, instead of conventional bevel gears used to turn the rotation direction, the oil passage in the center section is used to turn the power transmitting direction.

In a case where the center section is fixed to the butt joint surfaces of the half casings, when the half casings are fixedly jointed directly with a center section of aluminum die casting by use of four bolts, the center section may be distorted, thereby using three tightening bolts.

The above and further objects and novel features of the invention will more fully appear from the following detailed description when the same is read in connection with the accompanying drawings.

BRIEF DESCRIPTION OF THE DRAWINGS

FIG. 16 is a sectional plan view of the center section.

DETAILED DESCRIPTION OF THE PREFERRED EMBODIMENTS

Figure 1:
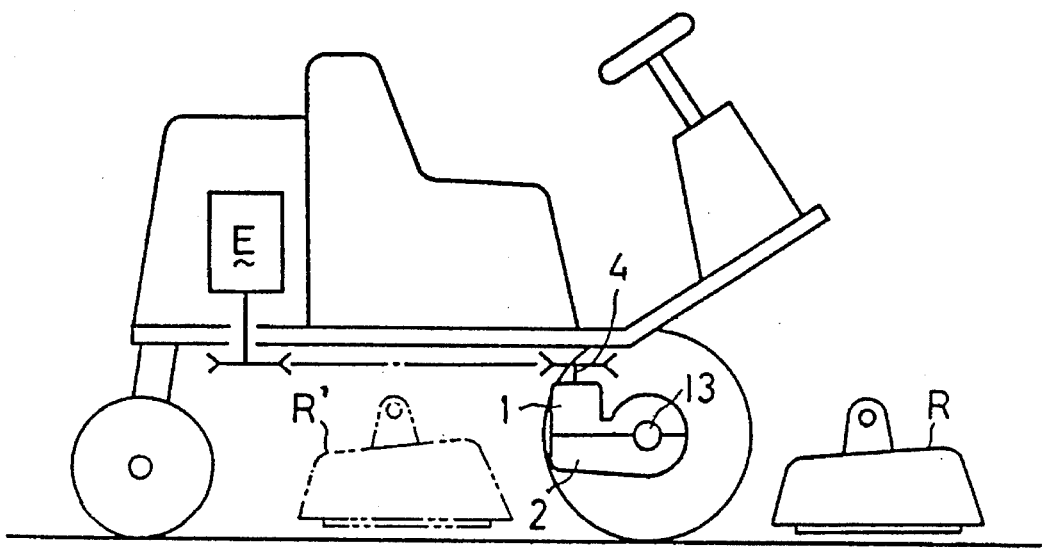
FIG. 1 is a side view of a light tractor attached with an axle driving apparatus of the invention.

Referring to FIG. 1, a light tractor loading thereon an engine E having a vertical crank shaft is shown.

A pulley is fixed to the vertical crank shaft of the engine so that a driving power is transmitted from the pulley through a belt to a pulley fixed to an input shaft, pump shaft 4 of a hydraulic pump P, projecting upwardly from an axle driving apparatus of the invention.

The tractor is provided at the front or under the body with a mower R or R' to thereby mow a lawn.

The present invention relates to an axle driving apparatus or transaxle and is specifically described herein as driving axles 13 of the tractor.

Next, the axle driving apparatus will be detailed of its construction in accordance with FIGS. 1–6.

Figure 2:
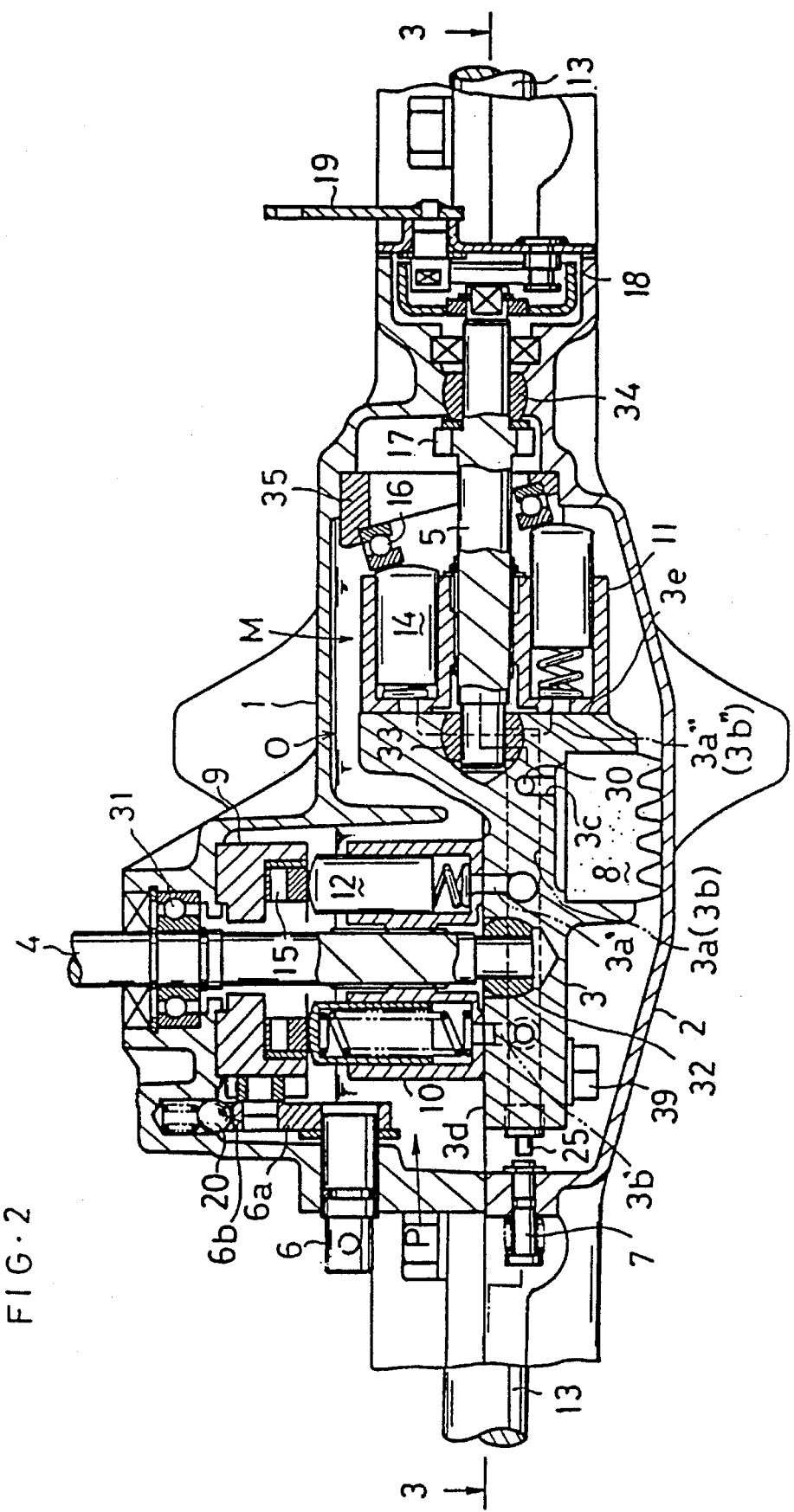
FIG. 2 is a sectional front view of the axle driving apparatus.

A transmission casing of the axle driving apparatus is formed in upper and lower half casings 1 and 2, both the casings being joined along a junction surface 2z (see FIGS. 3 and 13) to form one closed-type transmission casing. As shown in FIGS. 1 and 2, the junction surface is horizontally disposed when the casing is fixed to a vehicle.

Between the butt joint junction surfaces of the upper and lower half casings 1 and 2 are held bearings in parallel thereto, for the axles 13 and a counter shaft 24; and a bearing 34 for one end of a motor shaft 5. As shown in FIGS. 2–5, the longitudinal axes (5x, 13x, and 24x, respectively) of the motor output shaft 5, axles 13, and countershaft 24 are parallel to the junction surface, and are disposed within a single plane, more particularly, the plane defined by the junction surface.

At the lower surface of the upper half casing 1 is formed a mounting surface so that a center section 3 fixedly supporting the hydraulic pump P and a hydraulic motor M is mountable to the mounting surface through bolts 39 inserted into bolt holes 3g from below.

In the state where the center section 3, fixing thereto the hydraulic motor M and hydraulic pump P, is mounted to the lower surface of the upper half casing 1, the lower half casing 2 is jointed from below with the lower surface of the upper half casing 1 in a manner of closing the lower half casing 2 and bolts are used to connect both the upper and lower half casings 1 and 2.

The upper and lower half casings 1 and 2 are formed by aluminum die casting, whereby parts subjected to mechanical processing are reduced to lower the manufacturing cost.

The HST or hydrostatic type transmission stored within the axle driving apparatus comprises the hydraulic pump P, center section 3 and hydraulic motor M. The center section 3 is formed so that a pump mounting surface 3d formed on the center section 3 is parallel to the axles 13 and a motor mounting surface 3e formed on the center section 3 is perpendicular to the axles 13.

Pairs of crescent-shaped oil passages 3a' and 3b' and 3a" and 3b" are formed at the pump mounting surface 3d and motor mounting surface 3e, the pair of crescent-shaped oil passages 3a" and 3b" at the motor mounting surface 3e and pair of crescent-shaped oil passages 3a' and 3b' at the pump mounting surface 3d being connected to two oil passages 3a and 3b to constitute a closed circuit fluid path.

A cylinder block 10 for the hydraulic pump P is rotatably mounted on the pump mounting surface 3d and pistons 12 are inserted vertically slidably into a plurality of piston holes at the cylinder block 10 respectively.

When the pump shaft 4, supported by a bearing 31 at the upper half casing 1 and a spherical bush 32 at the pump mounting surface 3d, is rotated, the cylinder block 10 and pistons 12 rotate.

A thrust bearing 15 abutting against the upper end of each piston is changed at an angle by a swash plate 9, so that the discharge rate and discharge direction of the hydraulic pump P are changed to supply the discharged pressure oil from the oil passages 3a' and 3b' at the center section 3 to the hydraulic motor M through the oil passages 3a and 3b.

Figure 4:
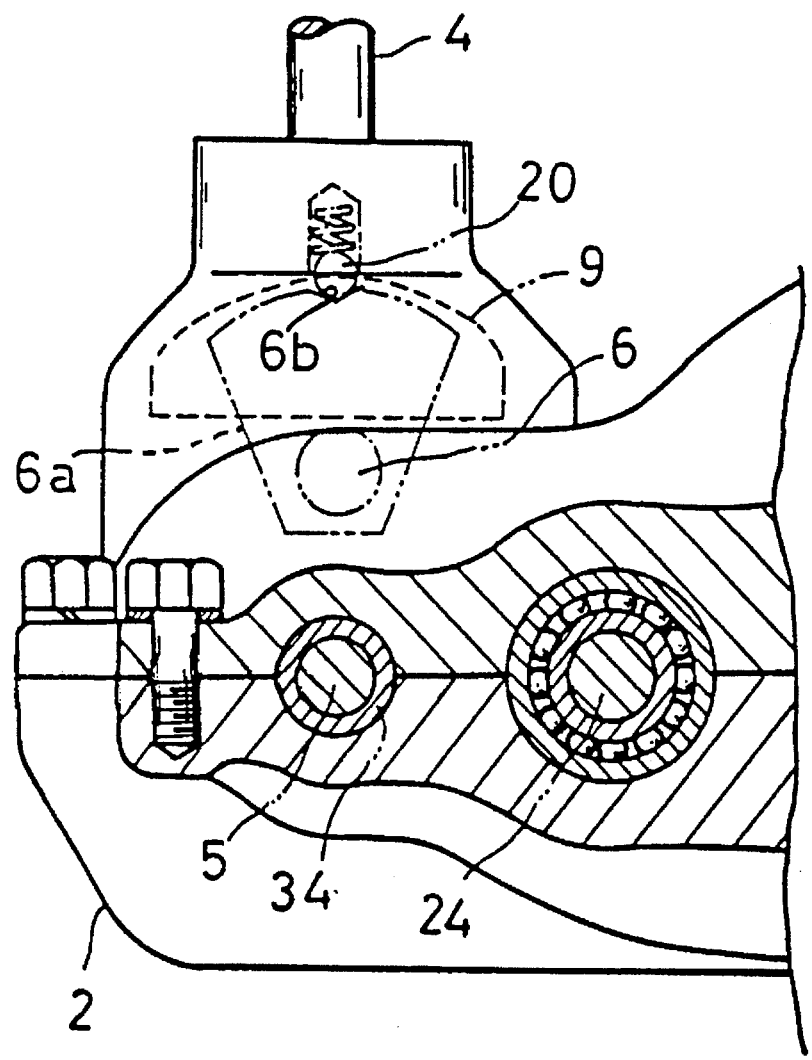
FIG. 4 is a sectional view taken on the line 4—4 in FIG. 3.
Figure 5:
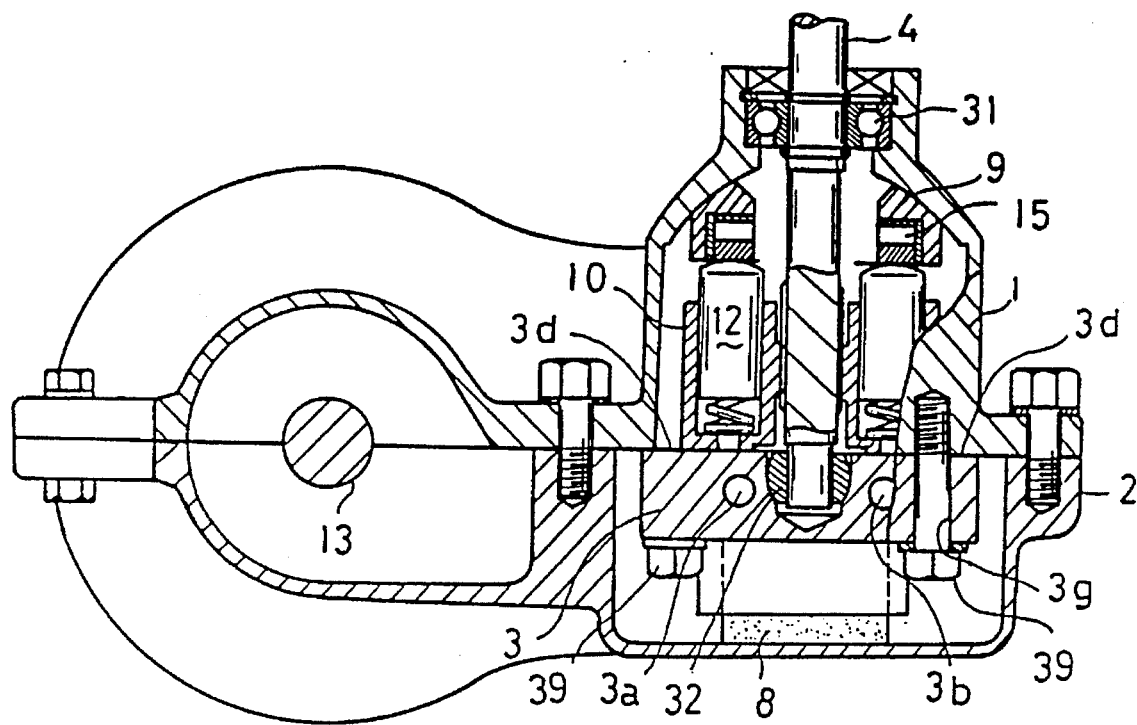
FIG. 5 is a sectional view taken on the line 5—5 in FIG. 3.

As shown in FIG. 4, the swash plate 9 is changeable of its angle through a positioning plate 6a in association with rotation of a speed change lever shaft 6, a detent unit 20 for holding the neutral position of the speed change lever shaft 6 being constituted in the upper half casing 1.

The detent unit 20 is fitted into a recess 6b at the positioning plate 6a, thereby enabling the neutral position to be ensured.

Figure 3:
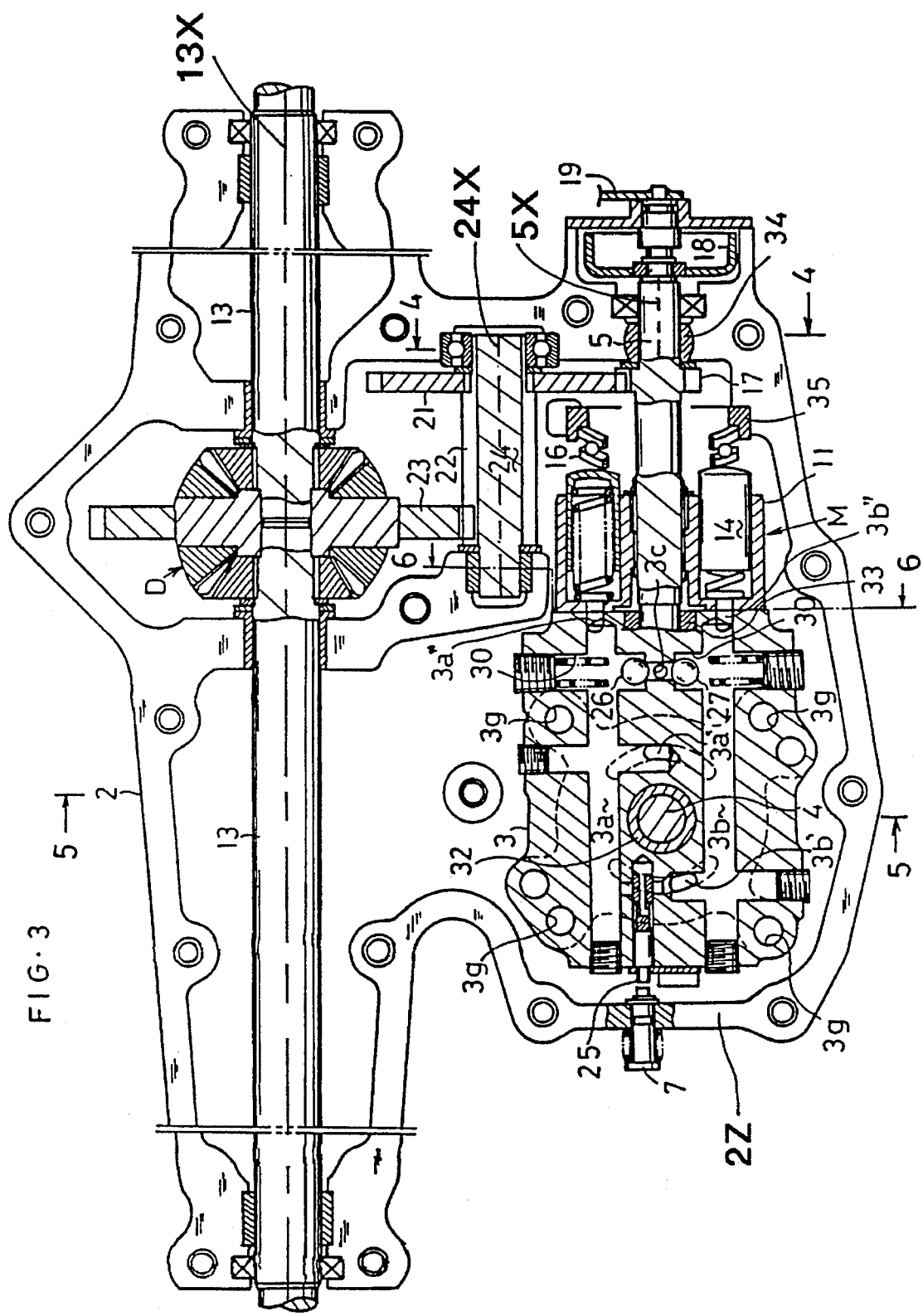
FIG. 3 is a sectional view taken on the line 3—3 in FIG. 2, in which an upper half casing is removed.

As shown in FIGS. 2 and 3, a short-circuit valve 25 of slidable selector valve for short-circuiting between the two oil passages 3a and 3b at the discharge side and the return side is disposed, so that when the valve 25 is open, generation of the state where the hydraulic motor M side is driven to send the pressure oil toward the hydraulic pump side can be avoided.

Reference numeral 7 designates a control for operating the short-circuit valve 25.

The short-circuit valve 25 and control 7 are slidably operated to push, to be engageable, or pull, without engagement, in order to be controllable in the abutting condition. Such construction enables simple assembly of the apparatus.

Between the oil passages 3a and 3b at the center section 3 are interposed check valves 26 and 27 to form an oil feed route 30, and between the check valves 26 and 27 is bored an operating oil suction port 3c extending downwardly.

In the lower end of operating oil suction port 3c is fitted an oil filter 8 formed of a spongy fine-porous material, the oil filter 8 contacting with the lower half casing 2 so as to be held thereto.

Thus, the oil filter 8, operating oil suction port 3c and check valves 26 and 27 are provided to communicate with the oil passages 3a and 3b through the check valves 26 and 27, whereby in a case where the hydraulic motor M and hydraulic pump P operate and the operating oil leaks from the interior of the closed circuit so as to decrease, the oil passage 3a or 3b generates therein negative pressure so that lubricating oil in the casing is taken in as the operating oil.

In addition, reference numeral 0 designates an oil level of lubricating oil filled into the transmission casing (FIG. 2).

The pump mounting surface 3d at the center section 3 is somewhat larger in its flat surface to also serve as the surface through which the center section 3 is mounted to the lower surface of the upper half casing 1.

A cylinder block 11 is rotatably mounted onto the motor mounting surface 3e at the center section 3, and pistons 14 are slidably fitted into a plurality of piston holes at the cylinder block 11 and always abut at the heads against a thrust bearing 16. In such construction, the pistons 14 push the thrust bearing 16 through the pressure oil from the oil passages 3a and 3b and slide down at the heads along the slanted surface of the thrust bearing so as to generate a torque, thereby rotating the cylinder block 11 and motor shaft 5.

The thrust bearing 16 is supported by an annular support 35 in relation of being slanted at a predetermined angle, the annular support 35 being fixedly sandwiched between the upper and lower half casings 1 and 2.

The motor shaft 5 is provided at one axial end journalled to the center section 3 with a spherical bush 33 and at the other end with a spherical bush 34, which are sandwiched between the upper and lower half casings 1 and 2.

Figure 11:
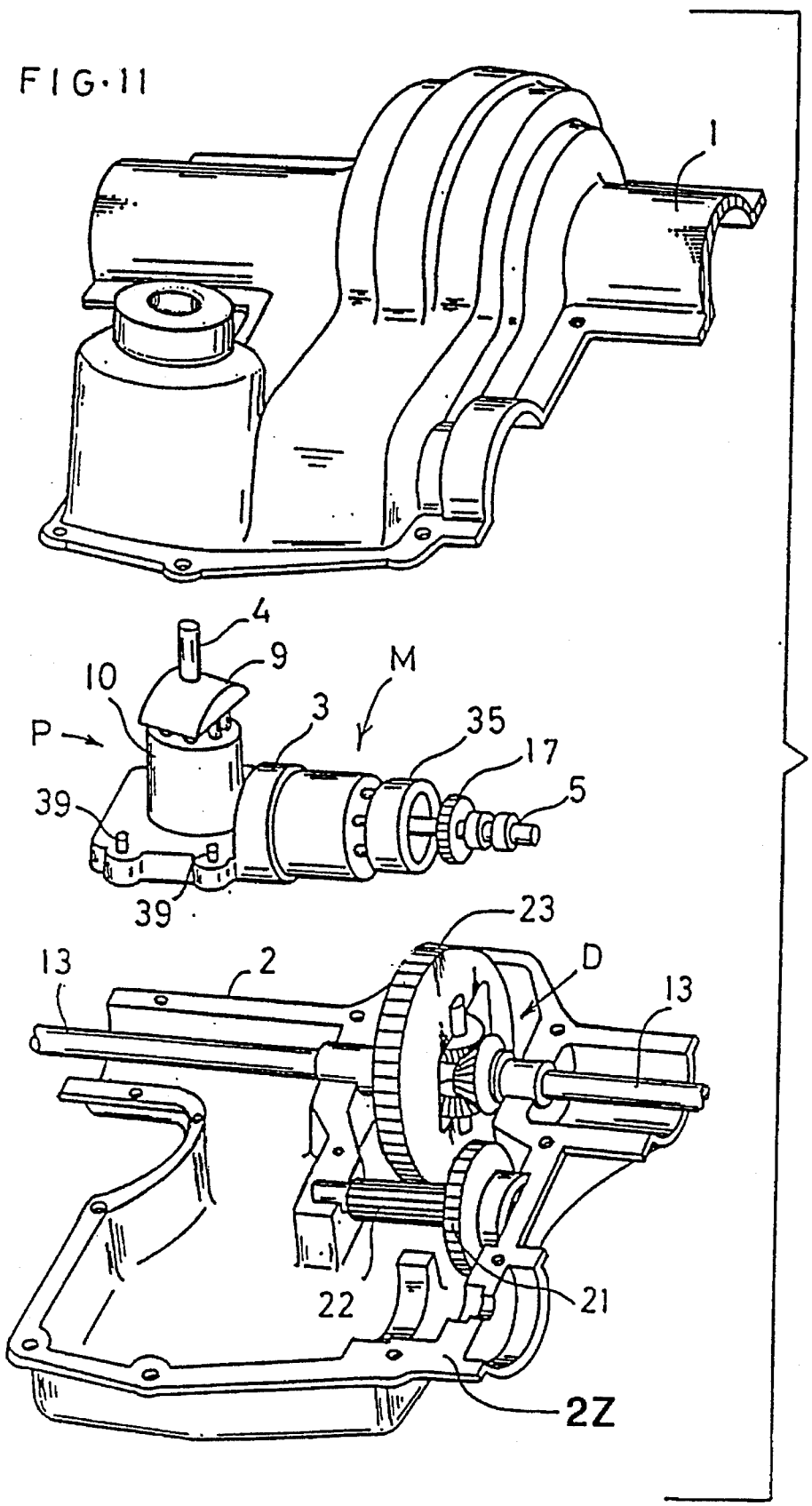
FIG. 11 is a perspective exploded view of the axle driving apparatus of the invention.

A gear 17 is mounted on the motor shaft 5 and engages with a gear 21 on the counter shaft 24, the gears 17 and 21 constituting the first deceleration means or first reducing gear unit (FIGS. 3 and 11). The counter shaft 24 provides means for transmitting power from the hydraulic motor M. As best seen in FIG. 3, the longitudinal axes of the motor shaft and the counter shaft are parallel to the longitudinal axis of the axle.

A small diameter gear 22 on the counter shaft 24 engages with a ring gear 23 at a differential gear unit D, which gives differential rotations to drive the axles 13.

The small diameter gear 22 and ring gear 23 constitute the second deceleration means or second reducing gear unit.

A brake drum 18 is fixed to the foremost end of the motor shaft 5 and brake shoes are expanded radially outwardly by a brake lever 19 to contact with the brake drum 18, thereby exerting the braking action.

Figure 6:
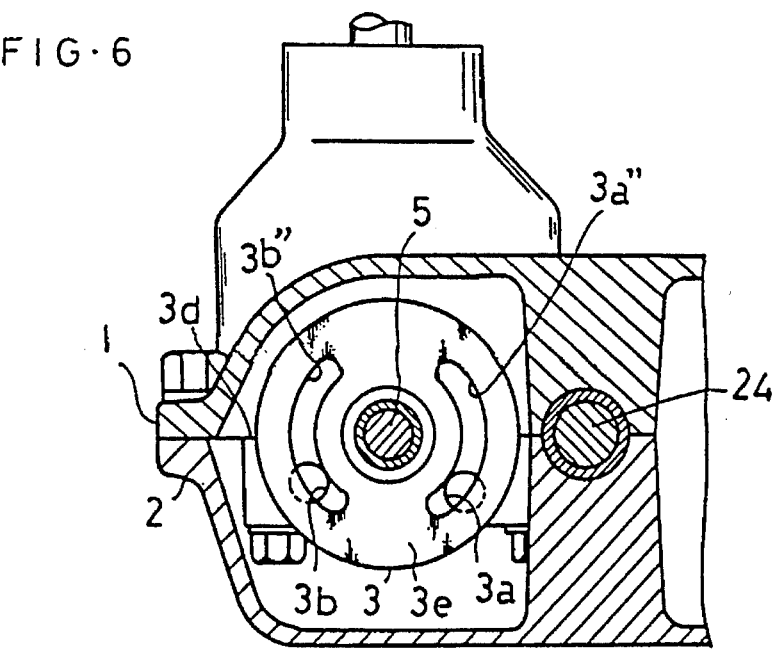
FIG. 6 is a sectional view taken on the line 6—6 in FIG. 3.
Figure 7:
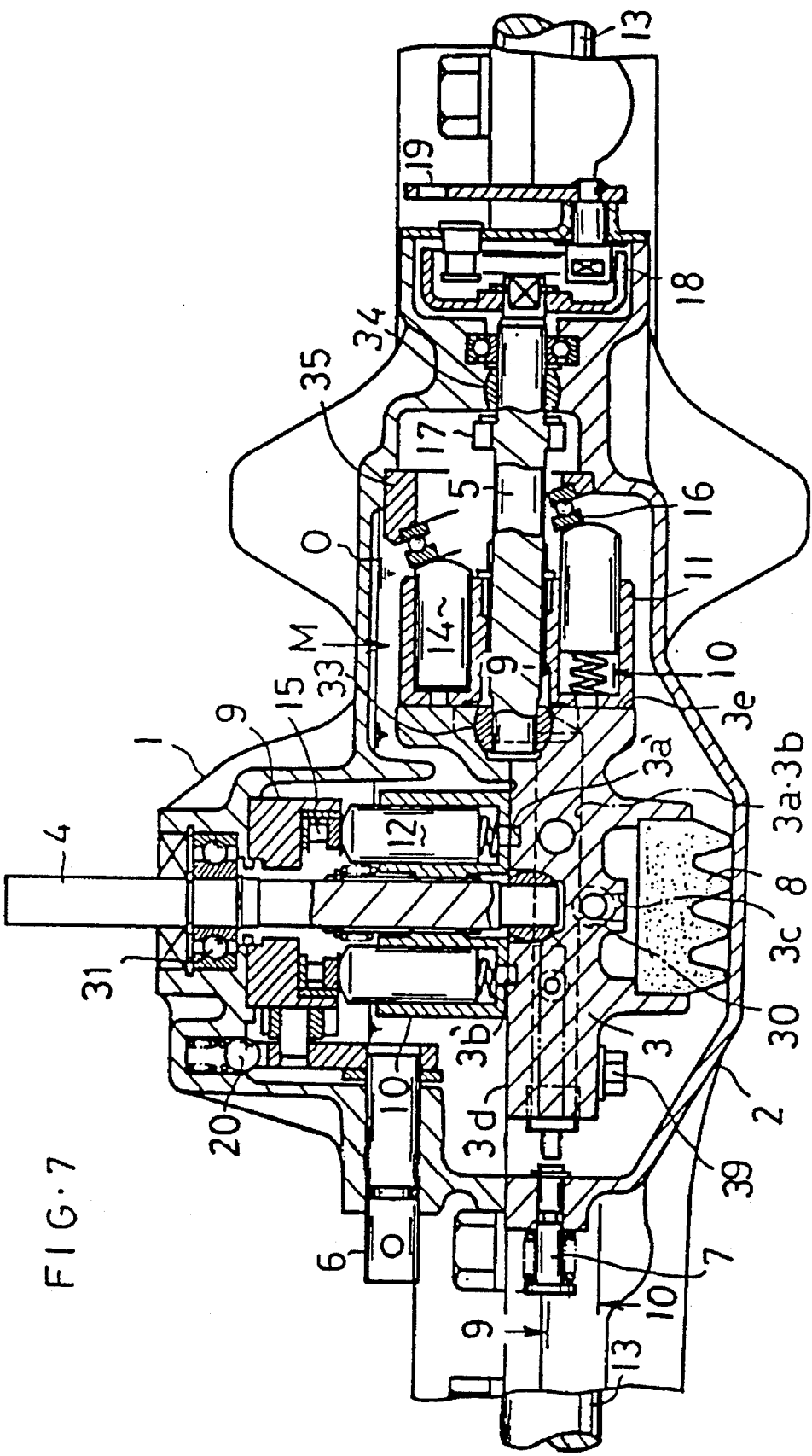
FIG. 7 is a sectional front view of a modified embodiment of the axle driving apparatus of the invention, in which the arrangement of the check valves is changed.
Figure 8:
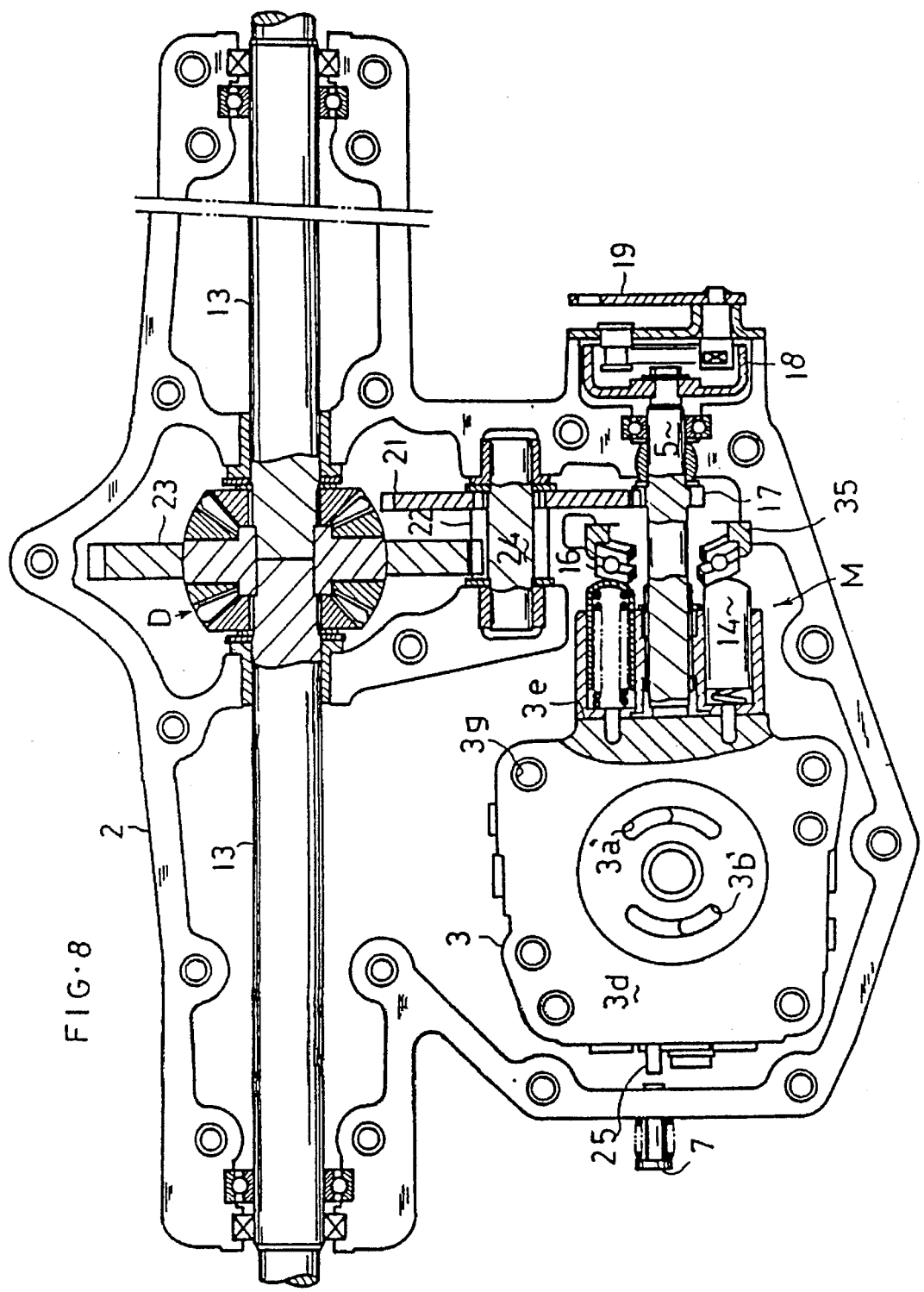
FIG. 8 is a plan view of the same.
Figure 9:
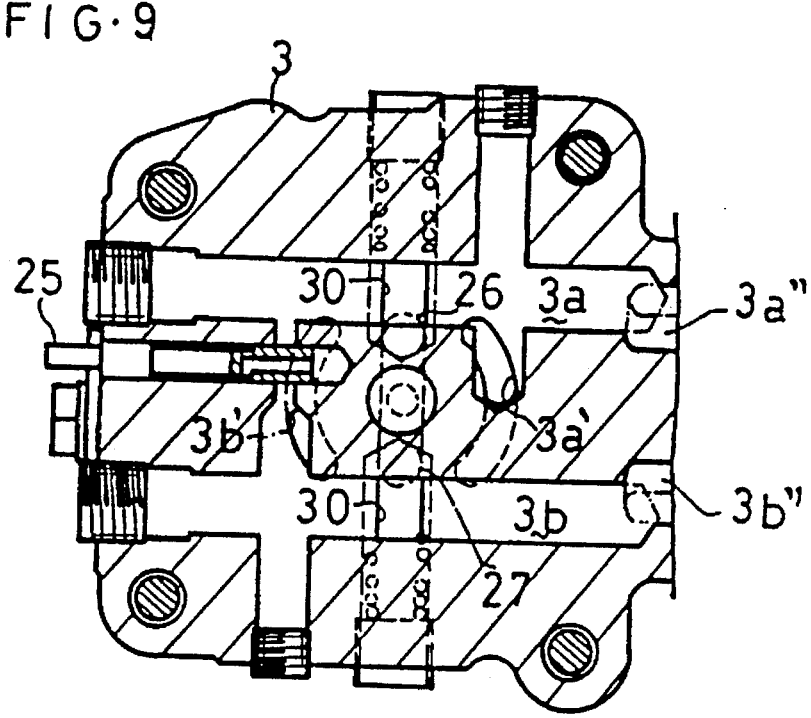
FIG. 9 is a sectional view taken on the line 9—9 in FIG. 7.
Figure 10:
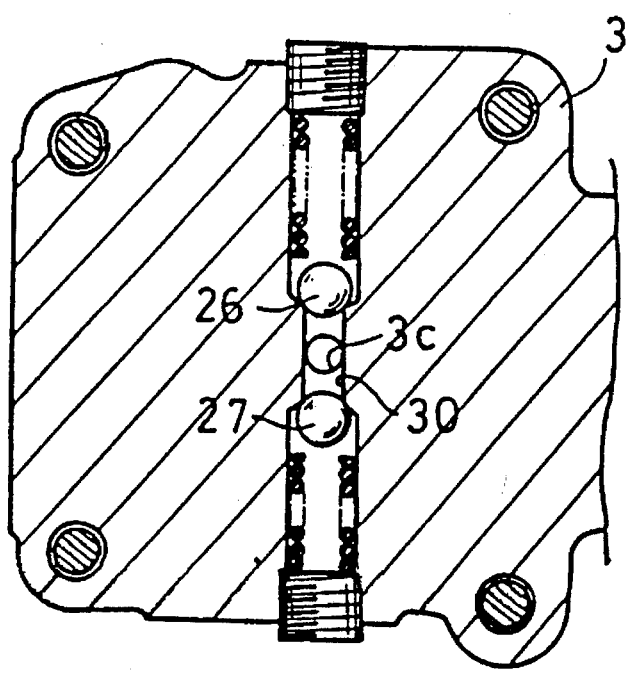
FIG. 10 is a sectional view taken on the line 10—10 in FIG. 7.

In FIG. 6, part of motor mounting surface 3e, against which the cylinder block 11 (see FIG. 2) for the hydraulic motor M abuts, is shown.

Referring to FIGS. 7, 8, 9 and 10, a modified embodiment of the axle driving apparatus of the invention will be described.

In the embodiment shown in FIGS. 2 and 3, the oil passages 3a and 3b and supply oil passage 30 are provided at the same plane, but in this case, the motor mounting surface 3e must separate with respect to the pump mounting surface 3d, whereby the center section 3 cannot be compact to that extent and also the casing becomes larger.

Therefore, in the embodiment shown in FIGS. 7–10, in order to eliminate the above defects, the supply oil passage 30 is disposed to overlap with the oil passages 3a and 3b in a range of thickness of the lower portion of the center section 3 and below the oil passages 3a and 3b.

The supply oil passage 30 is bored to communicate at the upper half thereof with the lower halves of the oil passages 3a and 3b in a manner of overlapping therewith. Hence, the oil passage connecting both the oil passages 30 and 3a, 3b is not required, thereby enabling the center section 3 to be made as small as possible in thickness.

At the center of the supply oil passage 30 is open an operating oil suction port 3c toward an oil filter 8 positioned below, and check valves 26 and 27 for opening or closing the communicating portion between the oil passages 3a and 3b are interposed in the supply oil passage 30 in relation of putting the operating oil suction port 3c between the check valves 26 and 27. Supply oil from the operating oil suction port 3c flows to the oil passages 3a and 3b though the portion at the supply oil passage 30 where the supply oil passes the check valves 26 and 27.

Thus, within the center section 3, the oil passages 3a and 3b, supply oil passage 30 and oil filter 8 overlap with each other, whereby the motor mounting surface 3e can approach the pump mounting surface 3d so as to enable the center section 3 to be compact.

Next, explanation will be given on the embodiment in FIGS. 12 and 13.

In this embodiment, a center section 3 abuts from above against the inner surface of the bottom wall of the lower half casing 2 and is fixed thereto.

Bolts 39 for fixing the center section 3 also are inserted from above into the bolt bores and screw with the lower half casing 2 respectively. Consequently, as seen in FIGS. 12 and 13, pump mounting surface 3d is offset from junction surface 2z (and axes 5x and 13x) by the top of bolt 39.

Figure 12:
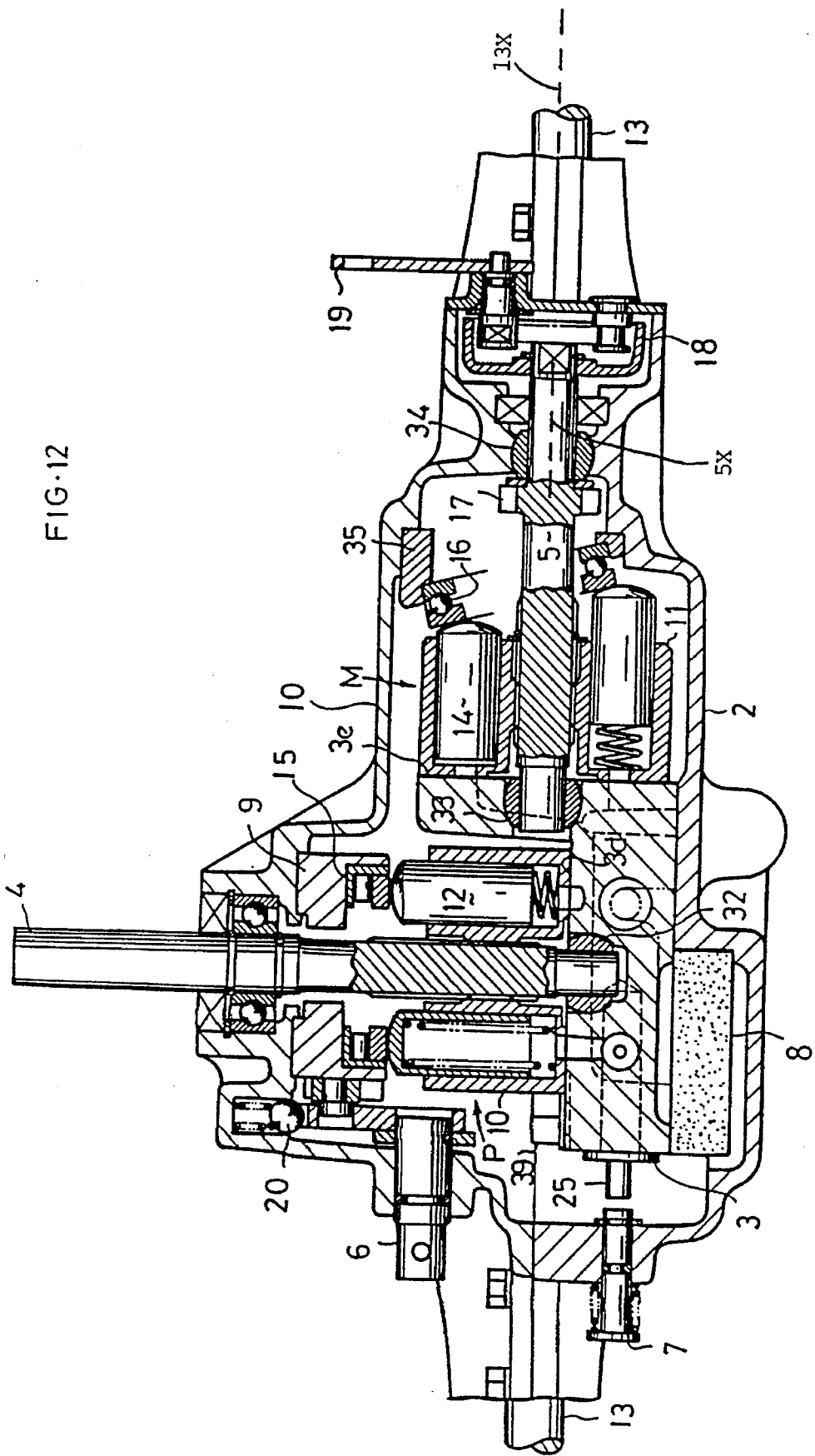
FIG. 12 is a sectional front view of another modified embodiment of the invention, in which a center section is fixed to the inner surface of the bottom wall of a lower half casing.
Figure 13:
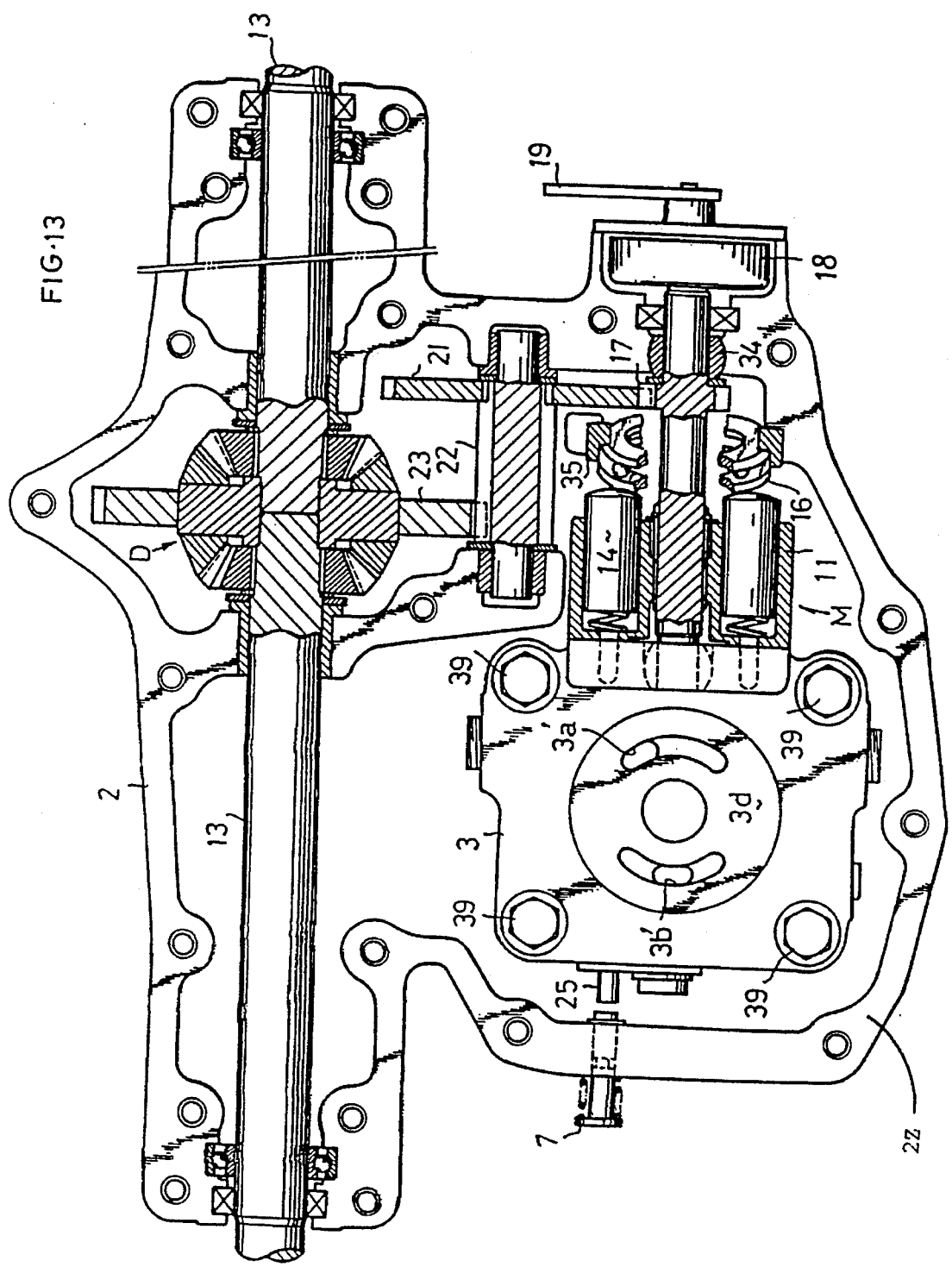
FIG. 13 is a plan view of the FIG. 12 embodiment.

The center section 3 in this embodiment, as shown in the sectional front view of FIG. 12, is about L-like shaped. The pump mounting surface 3d is formed on the longer pan of the L-shape, while the motor mounting surface 3e is formed on the shorter part of the L-shape, perpendicular to the pump mounting surface.

Other constructions of this embodiment are about the same as the aforesaid embodiment.

Next, explanation will be given on the embodiment in FIGS. 14, 15 and 16.

In this embodiment, three bolt bores 3g for three bolts 39 for fixing the center section 3 to the lower surface of the upper half casing 1 are provided at the center section 3, the three bolts 39 fixing the center section 3 at the casing mounting surface to the upper half casing 1.

The center section 3 and upper half casing 1 constitute material with aluminum die casting, the mounting surfaces of both the members being not applied with machining.

Rather than using four bolts 39 to fix the center section 3, in which an error in material may distort the section and prevent a tight fit, in the present invention three bolts 39 are inserted into three bolt bores 3g to fix the center section 3, thereby keeping all the bolts in good tight conditions.

Figure 14:
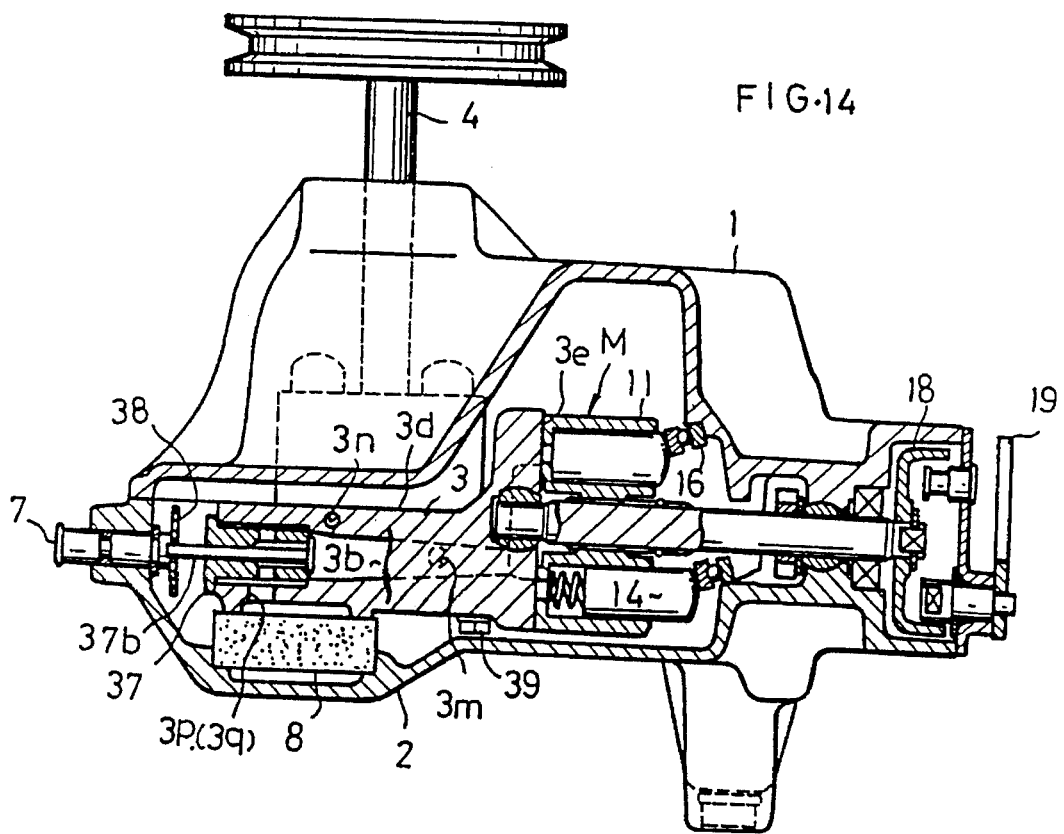
FIG. 14 is a sectional front view of a further modified embodiment of the invention, in which a center section has three bolt-bores into which three fixing bolts are inserted so that the center section is fixed therethrough to the upper half casing.
Figure 15:
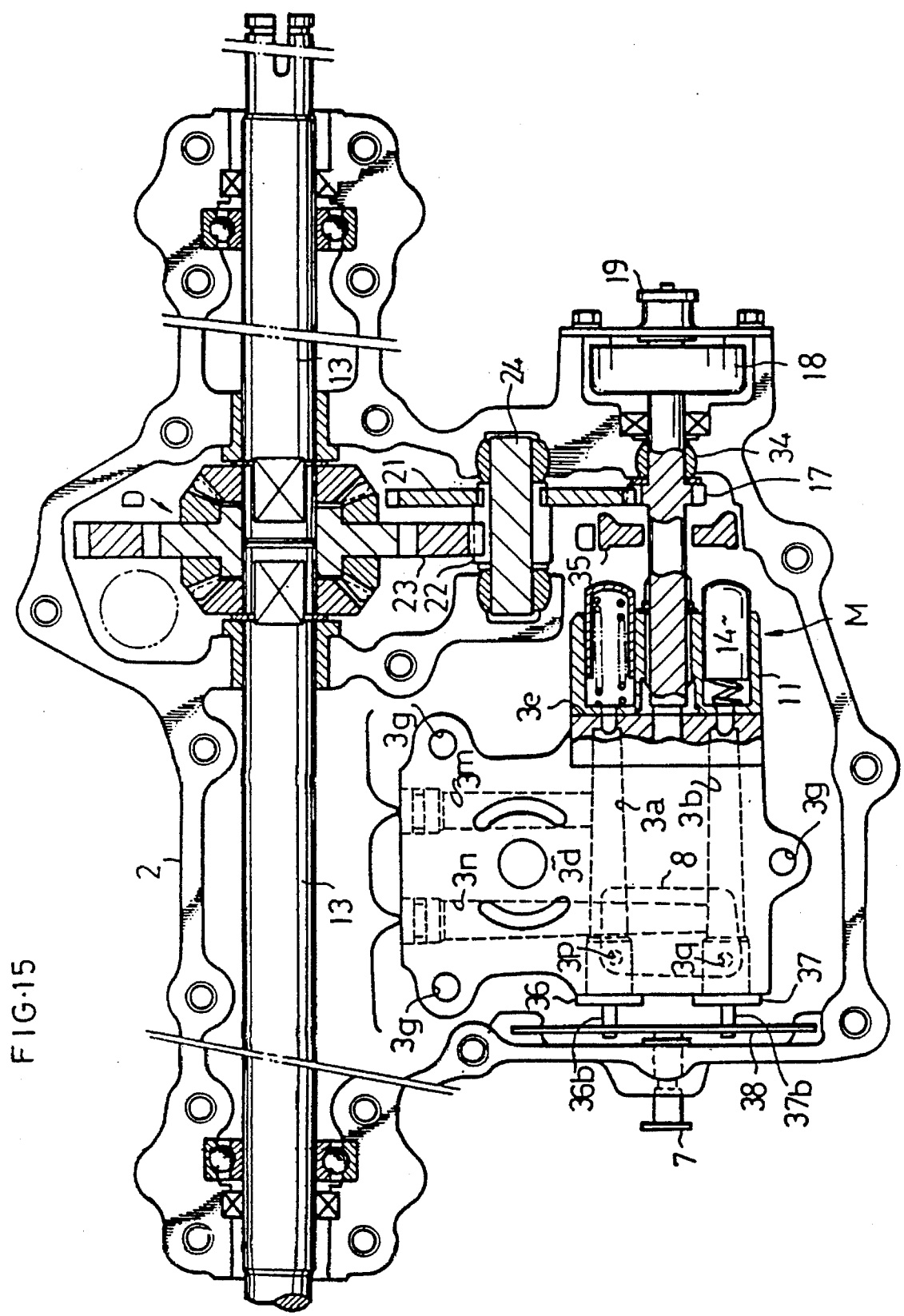
FIG. 15 is a plan view of the FIG. 14 embodiment.

In the embodiment in FIGS. 14, 15 and 16, the pump mounting surface 3d is not adjacent to the motor mounting surface 3e at the center section 3, but rather is adjacent to the axle 13.

Oil passages 3a and 3b are bored from a pair of crescent-shaped oil passages provided at the motor mounting surface 3e and extend in parallel to the axles 13, oil passages 3m and 3n being bored at a side of center section 3 from a pair of crescent-shaped oil passages and extending perpendicularly to the axles 13, so that both oil passages 3m and 3a and 3n and 3b are communicating with each other in the center section 3.

The open ends of oil passages 3m and 3n are plugged and the plugs are locked by projections formed at the bottom of the lower half casing 2 respectively.

Check valves 36 and 37 are provided at open ends of oil passages 3a and 3b, valve levers 36b and 37b of which are connected to a leaf spring 38.

The valve levers 36b and 37b are open only in the direction of flowing oil from the operating oil suction ports 3p and 3q into the oil passages 3a and 3b. The check valves 36 and 37 flow into the oil passages 3a and 3b the supply operating oil after passing the plate-like oil filter 8, and discharge to the exterior the pressure oil in oil passages 3a and 3b by pushing the valve levers 36b and 37b through the leaf spring 38 pushed by a control 7, thereby serving as the short circuit valves to cause the free condition of hydraulic motor M.

As seen from the above discussion, the center section 3 carrying the hydraulic pump P and its shaft 4 vertically and the hydraulic motor M and its shaft 5 horizontally (whereby the longitudinal axis of the pump input shaft is perpendicular to the longitudinal axes of the motor output shaft and the axle) is provided, and contained within the transmission casing while carrying both the pump P and motor M, whereby the operating oil, even when leaked from the hydraulic pump P or hydraulic motor M, does not flow out to the exterior. Also, since the oil passages are formed at the center section 3, no piping is required in or out of the transmission casing.

The center section 3 is fixed to the upper half casing 1 or the lower half casing 2, thereby being simple to support. Also, the pump shaft 4 and motor shaft 5 are simple to support.

The pump mounting surface 3d and motor mounting surface 3e are disposed in an L-like shape and the center suction 3 is about L-like shaped when viewed in section, so that the pump shaft 4 or input means is vertical and the motor shaft 5 or output means is horizontal, thereby making the axle driving apparatus compact without interposing the bevel gears, and the power transmitting direction can be changed at an angle of 90°, thereby having advantages for the tractor loading a vertical output shaft-type engine.

The center section 3 is fixed to the lower side of the butt joint surface of the upper half casing 1 so that the pump mounting surface 3d is level with the mounting surface of the center section 3 to the upper half casing, whereby the surfaces of the upper half casing 1, lower half casing 2 and center section 3 can be restricted to a minimum.

Three bores 3g for the three fixing bolts 39 through which the center section 3 is fixed to the lower surface of the upper half casing 1 are formed, so that when the mounting surfaces of center section 3 and of upper half casing 1 are fixed as they are not flattened but cast, there is no fear that a poor tightening condition is created on the center section 3.

The spherical bushing 32 at the pump shaft 4 and spherical bushing at the bearing for the motor shaft 5 are used, so that even when the center section 3 is mounted slantwise due to an assembly error or a machining error, variations in orientation of the pump shall 4 or the motor shaft 5 is absorbable.

Also, the spherical bushings are smaller in the size than the usual bearing, whereby the bearing is disposable without interfering with the oil passages bored at the center section.

Although several embodiments have been described, they are merely exemplary of the invention and not to be construed as limiting, the invention being defined solely by the appended claims.

What is claimed is:

1. An integrated hydrostatic transaxle comprising:

a transaxle casing including a first casing section and a second casing section joined along a horizontal peripheral junction surface;

a pair of oppositely extending axles disposed within said transaxle casing, said pair of axles having a longitudinal axis;

a hydraulic pump;

a hydraulic motor disposed within said transaxle casing, said hydraulic motor including an associated output shaft having a longitudinal axis; and a pump mounting surface disposed within said transaxle casing and offset from said peripheral junction surface for mounting said hydraulic pump within one of said first and said second casing sections.

2. An integrated hydrostatic transaxle according to claim 1, wherein said longitudinal axis of said output shaft and said longitudinal axis of said axle are parallel to said pump mounting surface.

3. An integrated hydrostatic transaxle according to claim 2, wherein said longitudinal axis of said output shaft and said longitudinal axis of said axle are contained within a plane defined by said peripheral junction surface so that said pump mounting surface is offset from said longitudinal axis of said output shaft and said longitudinal axis of said axle.

4. An integrated hydrostatic transaxle comprising:

a transaxle casing including a first casing section and a second casing section joined along a horizontal peripheral junction surface;

a pair of differentially connected oppositely extending axles disposed within said transaxle casing and having a longitudinal axis; and a hydrostatic transmission disposed within said transaxle casing, wherein said hydrostatic transmission includes:
   (a) a hydraulic pump;
   (b) a hydraulic motor including an output shaft having a longitudinal axis, said output shaft and said axles extending along said junction surface so that said longitudinal axis of said axle and said longitudinal axis of said output shaft define a plane; and
   (c) a center section, said center section including a pump mounting surface for mounting thereon said hydraulic pump and a motor mounting surface for mounting thereon said hydraulic motor, wherein said pump mounting surface and said motor mounting surface are perpendicular to each other, wherein said longitudinal axis of said output shaft is parallel to said pump mounting surface and said pump mounting surface is offset from said plane.

* * * * *

UNITED STATES PATENT AND TRADEMARK OFFICE
Certificate

Patent No. 5,598,748            Patented: February 4, 1997

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hideaki Okada, Takarazuki-Shi, Japan.

Signed and Sealed this Second Day of January, 2001.

DAVID A. BUCCI
*Supervisory Patent Examiner*
Art Unit 3682